Jan. 25, 1955  D. R. WOOLF  2,700,211
PROPELLER BLADE BLANK CONSTRUCTION
Filed Nov. 18, 1948  3 Sheets-Sheet 1
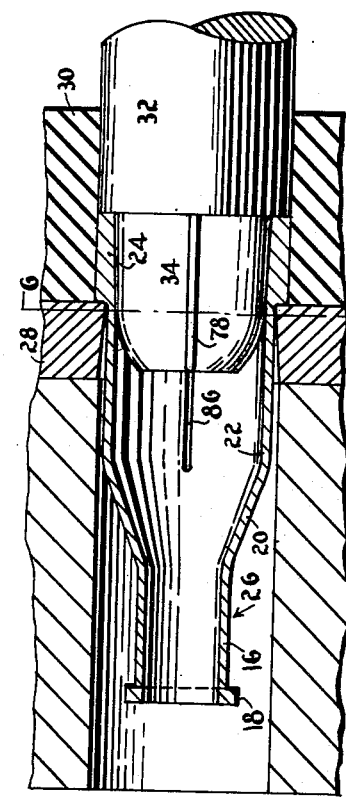
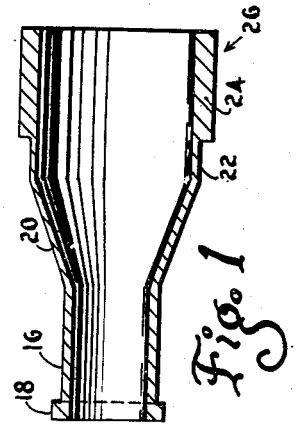
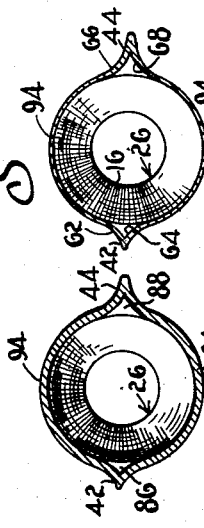
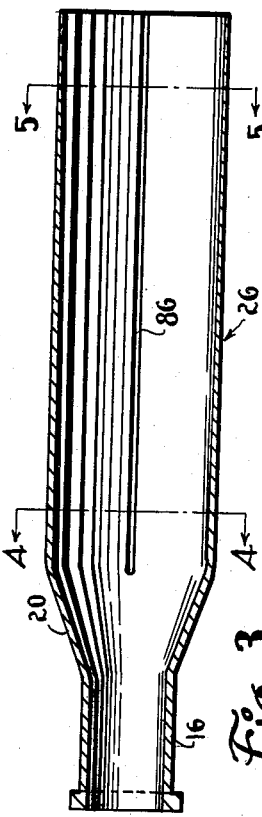
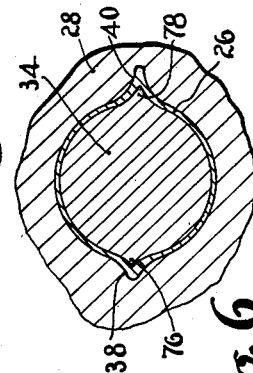
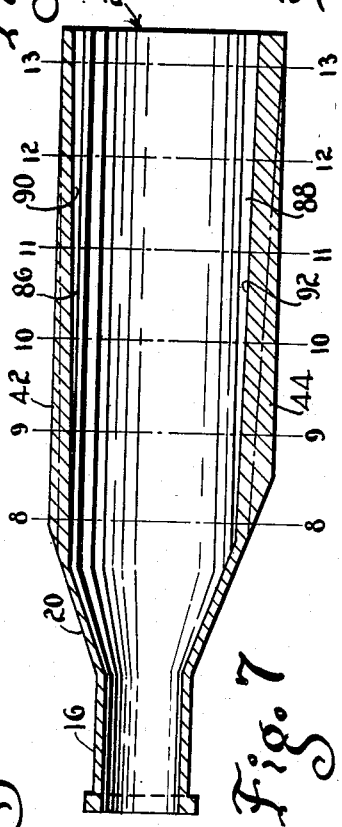
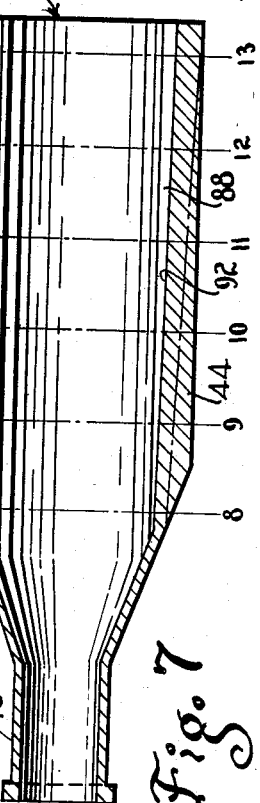
INVENTOR.
DON R. WOOLF
BY
*Godfrey B. Speir*
ATTORNEY.

Jan. 25, 1955

D. R. WOOLF 2,700,211

PROPELLER BLADE BLANK CONSTRUCTION

Filed Nov. 18, 1948

INVENTOR.
DON R. WOOLF
BY Godfrey B. Spier
ATTORNEY.

Jan. 25, 1955      D. R. WOOLF      2,700,211
PROPELLER BLADE BLANK CONSTRUCTION
Filed Nov. 18, 1948      3 Sheets-Sheet 3
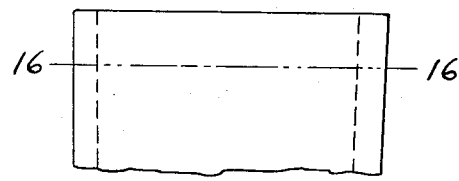
Fig.15
Fig.16
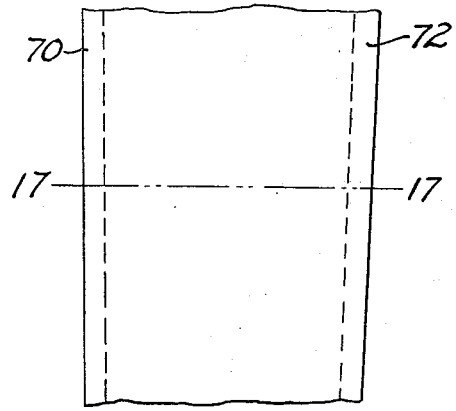
Fig.17
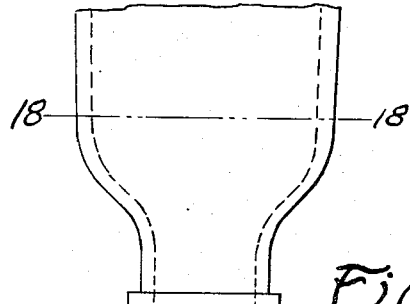
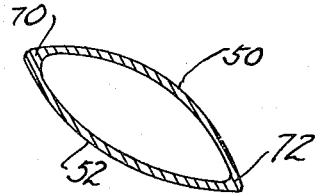
Fig.18
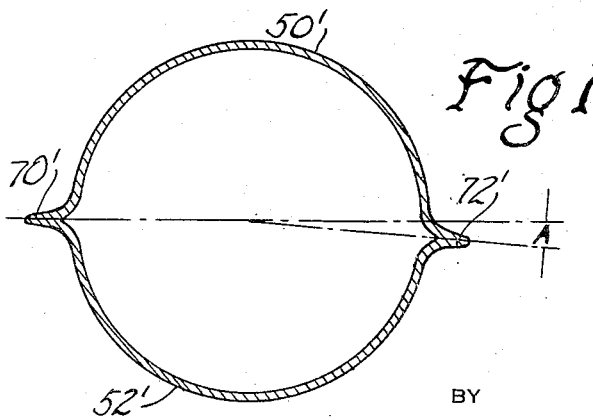
Fig.19
INVENTOR.
DON R. WOOLF
BY Godfrey B. Speir
ATTORNEYS.

United States Patent Office 2,700,211
Patented Jan. 25, 1955

2,700,211

PROPELLER BLADE BLANK CONSTRUCTION

Don R. Woolf, Caldwell, N. J., assignor to Curtiss-Wright Corporation, a corporation of Delaware Application November 18, 1948, Serial No. 60,706

1 Claim. (Cl. 29—190)

This invention relates to propeller blades for aircraft and is concerned particularly with the design and manufacture of hollow steel propeller blade blanks which subsequently are formed into finished hollow steel blades.

Objects of the invention are: to provide a seamless, tubular, hollow, metal blade blank, portions of which are pre-formed, during the fabrication of the blank, to desired dimensions whereby finishing operations when the blade is formed will be simplified and minimized; to provide a tubular steel blank having longitudinal, substantially diametrically opposed protrusions thereon, which protrusions have dimensional characteristics suitable for the production of a hollow steel propeller blade; and to provide a tubular blank, tapered in thickness, with leading and trailing edge protrusions whose thickness is established in the formation of the tubular blank.

Other objects of the invention will become apparent in the drawings and in the following specification. The latter is not to be construed as limiting the scope of the invention. The novel features of the invention are set forth in the appended claims.

The invention constitutes improvements which will be pointed out later in detail in a technique for extruding tubular blanks which may be formed into propeller blades. This technique in brief, consists in fabricating a ringlike blank which is heated and placed within the loading cavity of an extrusion press. The press is provided with an external die which defines the exterior form of the extruded product. The press is further provided with a punch secured to the end of the press ram, the punch defining the interior shape of the extruded product as the annular blank is extruded from the press loading cavity by the action of the ram. The punch is preferably tapered so that the resulting extruded product is tapered in wall thickness and is extruded in the form of a tube having a constant exterior form throughout its length as established by the extrusion die, and a changing interior form as established by the extrusion punch. In the practice of this extrusion technique, the die may be notched so that the extruded product has externally projecting ears or ribs and when the ribs are to be produced, the heavy ring of the blank to be extruded preferably has a diameter as great as the overall distance across the ribs. Furthermore, the punch may be provided with protruding ribs, matching the notches in the die, so that the interior of the extruded tube is grooved where the punch ribs engage the blank, said grooves lying within the external ribs on the extruded tube, so that comparatively sharp leading and trailing edge elements are formed.

After extrusion of the ribbed and grooved tube, the tube may be flattened so that the sections thereof approach airfoil profile, whereupon the flattened tube is confined between forming dies, while hot, and gas under high pressure is admitted within the tube to "blow up" the tube to contact the interior faces of the die cavities whereby the propeller blade is given its desired final form. This invention, utilizing the above briefly described technique, comprehends a particular manner of forming the notches in the extrusion die and the ribs on the extrusion punch so that the leading and trailing edge ribs on the extruded products will be so formed as to require a minimum of machining operations for finishing the extruded tube into a propeller blade.

The details of the invention may be more clearly understood by referring to the drawings in connection with the following specific description. In the drawings similar reference characters indicate similar parts, and Fig. 1 is a longitudinal section through a blade blank prior to extrusion;

Fig. 2 is a section through a portion of an extrusion press showing a blade blank therein in a partial state of extrusion;

Fig. 3 is a longitudinal section through an extruded blade blank;

Figure 14:
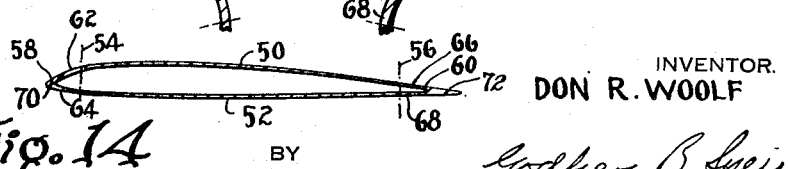

Figs. 4 and 5 are sections on the lines 4—4 and 5—5 respectively of Fig. 3;

Fig. 6 is a section on the line 6—6 of Fig. 2;

Fig. 7 is a longitudinal section through an extruded blade blank, similar to Fig. 3 but taken through a plane at right angles to the plane on which the section of Fig. 3 is taken;

Figs. 8 through 13 inclusive are respectively enlarged fragmentary sections on the lines 8 through 13 inclusive of Fig. 7 showing blade blank portions machined to final form;

Fig. 14 is a typical cross-section of a finished propeller blade built in accordance with the invention.

Fig. 15 is a plan of a finished blade; Figs. 16, 17 and 18 are sections on the lines 16—16, 17—17 and 18—18 respectively of Fig. 15; and Fig. 19 is a section of a blade blank showing non-opposite ribs.

Referring first to Figs. 1, 2 and 6, the parts arrangements for extruding a tubular propeller blade blank are shown. In these figures and in other figures, the rudimentary blade blank includes a pre-machined substantially cylindrical shank portion 16 which may if desired be provided with an end flange 18 which in the final propeller blade serves as an abutment by which the blade is held in a propeller hub. At its other end, the shank portion 16 blends into a pre-machined tapered portion 20 whose larger outer end blends into a rudimentary blade forming portion 22. In the initial blank as shown in Fig. 1, the portion 22 is integral with a heavy annular ring 24 which comprises the material from which the ultimate blade blank is to be extruded. In Fig. 2, the partly finished blade blank, indicated in its entirety as 26, is shown in position in an extrusion press wherein 28 indicates the extrusion die and 30 indicates the cylindrical loading receptacle within which the portion 24 of the blade blank 26 is confined. A press ram 32 enters the bore of the press portion 30. The nose of the ram 32 is provided with a punch 34 whose exterior surface is longitudinally tapered so that as the punch enters the die 28, an annular extrusion opening is formed between the punch and the die through which the material 24 of the blank must pass. As the punch continues to pass through the die 28, this annular extrusion opening becomes narrower so that the material of the blank 26 must accordingly become thinner. Thus, as the extrusion pass is completed, the extruded product will have the appearance of the article shown in Fig. 3 wherein the blade portion 22 nearest to the blade shank will have a fairly thick wall and as the right hand end is approached as shown in Fig. 3, the wall thickness will become less in accordance with the taper provided on the punch 34. This can readily be seen in Figs. 4 and 5, wherein Fig. 4 shows a comparatively great wall thickness for the blade blank near the shank and Fig. 5 shows a lesser wall thickness for the blank near what will become the blade tip.

The extrusion procedure thus far described would produce merely a seamless, cylindrical tube of varying wall thickness. If such a cylindrical tube were to be flattend and then formed into airfoil section to provide a propeller blade, the leading and trailing portions of the blade would necessarily be produced by sharply creasing the flattened tubular blank and this sharp creasing would produce incipient cracks at the leading and trailing edges which would lead to blade failure. To provide for leading and trailing edges in a propeller blade blank which will not be susceptible to undue strain and failure in the ultimate product, the extrusion technique above described is arranged to provide extruded ribs on the blade blank which shall finally form leading and trailing edges of the propeller blade. The ribs are formed by notching the die 28 as noted in Fig. 6 at 38 and 40, the notch 38 providing a leading edge rib 42 on the extruded product and the notch 40 provding a trailing edge rib 44 on the extruded product. These ribs so far as the extruded blank is concerned will have uniform external profile throughout the length of the extruded blank. As will later be described in detail, the form of the notches 38 and 40 in the die will be so made as to provide leading and trailing edge ribs which may be dressed off in part as the propeller blade takes form to yield the particular external profile needed for the leading and trailing edges at the several stations along the propeller blade.

Reference may be made to Figs. 14 and 16 to 18 showing typical final blade cross-sectional profiles. The blade section includes a camber plate portion 50 and a thrust plate portion 52 both as shown in Fig. 14 extending between construction lines 54 and 56 respectively near the leading and trailing edges of the blade section. The plate portions at any station along the blade, between the construction lines 54 and 56 will be of substantially uniform thickness. The camber and thrust plates come together at the leading edge at point 58, and at the trailing edge at point 60. The plate portions 62 and 64 between the construction line 54 and the point 58 increase slightly in thickness toward the leading edge. Similarly, the plate portions 66 and 68 between the construction line 56 and point 60 increase gradually in thickness. From the point 58 forward, the two plates become an integral thickened edge, designated 70. Rearward of the point 60, the two plates become an integral trailing edge portion 72 thicker than either of the plates 50 or 52.

In the extrusion of the blade blank, the camber and thrust plate portions 50 and 52 are formed between the cylindrical portions of the die 28 and the punch 34 while, according to the invention, the portions 70, 62 and 64 for the leading edge and the portions 66, 68 and 72 for the trailing edge are formed by the grooves 38 and 40 in the die 28 in cooperation with rib portions 76 and 78 formed on the punch 34. These rib portions 76 and 78 are tapered and vary in height along the length of the punch and are endowed with different profiles along the length of the punch so that, in cooperation with the die grooves 38 and 40, the desired thickness of the extruded blade blank will be attained in the zones 62, 64 at the leading edge and 66, 68 at the trailing edge. The taper of these ribs and of the punch 34 is such that they progressively separate from the extruded blank as an extrusion pass is in progress, providing ample clearance and obviating binding of the extrusion blank on the punch 34. The solid leading edge portions 70 and the solid trailing edge portions 72 will also be formed between the die grooves and the punch rib portions as part of the ribs 42 and 44.

Since the profiles of the die portions 38 and 40 produce ribs 42 and 44 of uniform profile throughout the length of the extruded blank, and since the actual leading and trailing edge profiles desired in the blade are not uniform along the blade length, it is necessary to machine and shape the solid portions of the extruded ribs 42 and 44 to secure the desired blade edge profiles. However, the extruded rib may be profiled as shown to that shape which is desired near the extreme tip of the blade so that no machining of the rib is needed at this station. This is exemplified in Fig. 13 where the solid line profiles are the actual profiles of the extruded rib. In Figs. 8 through 12, the dot-dash lines represent the profiles of the extruded ribs 42 and 44 as formed by the die grooves 38 and 40 and in finishing the blade, portions of these ribs are machined off and profiled to the actual leading edge profile 80 and the actual trailing edge profile 82, leaving at the several stations solid leading and trailing edge portions 70 and 72 respectively.

It can readily be seen that the design of the propeller blade as exemplified by Fig. 14 dictates the cross-sectional shape of the punch rib portions 76 and 78, so the following portions of the specification will describe the desired relationships of the leading edge profile 80, and the plate portions 62 and 64 adjacent the leading edge and also, the trailing edge profile 82 and the plate portions 66 and 68 adjacent the trailing edge. These relationships will establish the die groove and punch rib portion profiles for fabricating the desired article.

Figure 8:
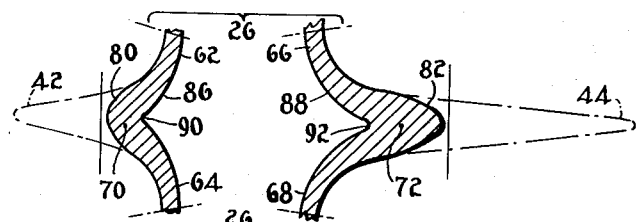
Figure 9:
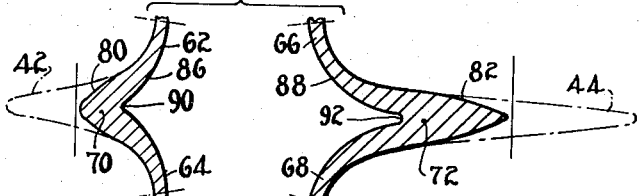
Figure 10:
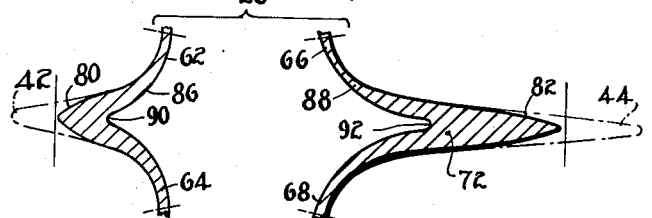
Figure 11:
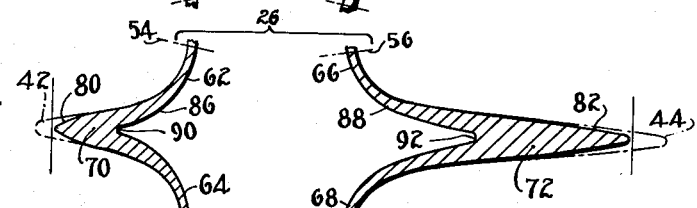
Figure 12:
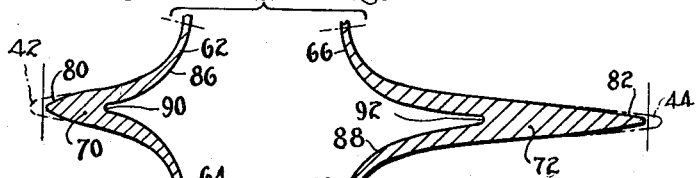
Figure 13:
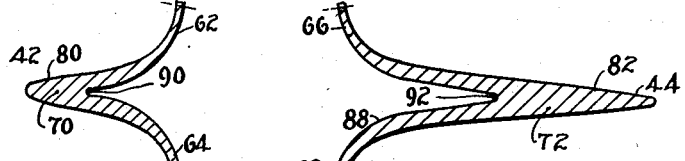

At the station on the blade blank represented by Fig. 8, the tube thickness is great and the final propeller blade will have comparatively dull leading and trailing edge profiles 80 and 82 respectively, these latter dull profiles being obtained by machining away outer portions of the ribs formed on the extruded blade blank. Progressively, approaching the tip of the blade blank, the leading and trailing edges become more and more sharp and accordingly the machining away of extruded rib portions will become progressively less toward the tip of the blade as exemplified by the sequence of Figs. 8 through 13. At the blade tip, as indicated previously, the extruded ribs actually have the profile desired for the leading and trailing edges.

As previously noted, the thickness of the thrust and camber plates becomes progressively less toward the blade tip as established by the tapered extrusion punch 34. With the same progression, grooves 86 and 88, formed in the blade blank by the punch rib portions 76 and 78, become progressively deeper, entering farther and farther into the ribs 42 and 44 as the blade tip is approached. This is clearly shown by the progressively thinner camber plate portions 62 and 66 from Figs. 8 toward 13 and the progressively thinner thrust plate portions 64 and 68 from Figs. 8 toward 13. In the several figures, the deepest portion of the blade blank groove is shown at 90 for the leading edge and 92 for the trailing edge, these deepest portions comprising small radius fillets to reduce possibility of cracking at the juncture of the thrust and camber plates of the propeller blade when the latter is finally formed, finished and operated.

It will be noted that the blade plate portions 62, 64, 66 and 68 are formed wholly in the extrusion operation and that the thickness of these portions is controlled in the extrusion process. No machining of these portions is required. The only machining which is required on the blade blank is the dressing off of the solid portions of the ribs 42 and 44 to form the solid leading and trailing edge portions 70 and 72 of the blade, to attain the desired leading and trailing edge profiles 80 and 82 at the several sections. Also, the portions 62, 64, 66 and 68 in the extruded blank are not sharply curved, so that when the blank is flattened and processed between forming dies, these portions may be flattened without introducing significant strains which might result in cracking or faults in the blade.

In previous arrangements suggested in connection with extrusion of blade blanks, considerable machining was necessary in the thrust and camber plates adjacent the trailing and leading edges to establish proper thickness relationships. These machining operations were costly and difficult of attainment and the present invention obviates these difficulties.

In the practice of the invention, having established the extrusion process to attain a tubular blade blank extrusion, blanks may be fabricated comparatively cheaply and expeditiously, the blanks comprising seamless tubular elements. The finishing operation to form a blade from these blanks consists merely in flattening the tubular blanks so that the tubular portions of the blanks indicated at 94 in Figs. 4 and 5 are flattened out and so that the reversely curved portions 62, 64, 66 and 68 in Figs. 8–13 are also flattened out. Thereupon, the ribs may be machined as above indicated to the leading and trailing edge profiles 80 and 82. Thereafter, the blade blank is heated and placed in forming dies, high pressure gas being injected within the blade blank by known techniques so that the walls of the tube are expanded into intimate engagement with the die walls and so that the tubular blank is converted to airfoil profile such as is shown in Fig. 14.

Final finishing of the blade is then accomplished according to known and existing techniques. Closure of the tip of the blade may be accomplished by a plastic filler (as shown in Le Compte application No. 55,264, filed October 19, 1948, now Patent No. 2,581,193, granted January 1, 1952) or by welding the flattened blank portions together, and plastic ribs may be inserted as taught in said Le Compte application.

The final blade plan form according to this invention will be more or less rectangular and is generally exemplified by the plan form of Fig. 15. As the blade blank is flattened, a greater degree of flattening takes place at the tip than toward the shank so that the chord of the blade sections at the tip is slightly greater than the chord of the blade sections near the shank as shown in Figs. 16 to 18.

In finishing the blade, it is further noted that the usual blade twist to secure variations in pitch between the shank and tip ends of the propeller blade is imparted to the blade of this invention in the final forming die operation. When the final blade profiles include non-symmetrical sections wherein the camber plate of the blade has greater peripheral span than the thrust plate, the tubular extruded blank will be formed as in Fig.

19 with the leading and trailing edge ribs 70' and 72' respectively slightly displaced circumferentially from opposition to one another by an angle A in order that the longer camber element 50' and the shorter thrust element 52' will inherently lie in the tubular blank before final fabrication and forming of the propeller blade.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claim for a definition of the limits of the invention.

What is claimed is:

A blank for forming a hollow propeller blade comprising a tube having substantially semi-cylindrical concentric wall portions of constant external diameter and of tapering internal diameter from one end to the other, whereby the wall thickness of said tube varies throughout its length, said tube, externally, having longitudinal external integral uniform ribs disposed substantially oppositely therealong and joining said semi-cylindrical portions, said ribs having the side walls thereof smoothly blended into the outer surface of said semi-cylindrical portions, and said tube having grooves internally thereof, disposed within said ribs, the grooves having the walls thereof smoothly blended into the internal walls of said semi-cylindrical portions, the depth of said grooves tapering from a shallow depth at the thick end of said tube to a greater depth at the thin end of said tube, and said grooves being profiled in cross-section to create a tapered thickness of rib wall at each station along the tube blending from the thickness of wall of the adjacent semi-cylindrical portion at the same station along the tube to a greater thickness adjacent the deepest part of said groove.

References Cited in the file of this patent

UNITED STATES PATENTS

| | | |
|---|---|---|
| 822,285 | Lee | June 5, 1906 |
| 1,920,830 | Wylie | Aug. 1, 1933 |
| 2,094,076 | Martin | Sept. 28, 1937 |
| 2,138,127 | Squires | Nov. 29, 1938 |
| 2,256,545 | Bothmann | Sept. 23, 1941 |
| 2,308,344 | Andrake | Jan. 12, 1943 |
| 2,333,859 | Groene | Nov. 9, 1943 |
| 2,431,411 | McKee | Nov. 25, 1947 |
| 2,471,485 | Gruetjen | May 31, 1949 |
| 2,512,264 | Brauchler | June 20, 1950 |

FOREIGN PATENTS

| | | |
|---|---|---|
| 12,847 | Great Britain | June 3, 1907 |
| 524,152 | Great Britain | July 31, 1940 |